Sept. 24, 1968  W. MENZEL  3,402,567

FREEZING KETTLE FOR SOFT ICE FREEZER

Filed May 26, 1967  2 Sheets-Sheet 1

(A-B)

Inventor:
WALDEMAR MENZEL

BY Robert K. Jacob

AGT.

United States Patent Office 3,402,567
Patented Sept. 24, 1968

3,402,567
FREEZING KETTLE FOR SOFT ICE FREEZER
Waldemar Menzel, Burgheig, near Kulmbach, Germany, assignor to Firma Lumen G.m.b.H., Nahrmittel- und Maschinenfabrik, Kulmbach, Germany
Filed May 26, 1967, Ser. No. 641,590
Claims priority, application Germany, May 28, 1966, G 34,771
3 Claims. (Cl. 62—306)

ABSTRACT OF THE DISCLOSURE

A freezing kettle which is divided into a freezing compartment and a receiving compartment for the ice mix by a disk which is circumferentially spaced from the walls of the kettle to permit the passage of air, thereby balancing the pressure in both compartments, and where a special compressed air supply is connected to the receiving compartment and in which the ice mix can pass in both directions through slots in the separating disk.

Background of the invention

The invention relates to food ice freezers and, more in particular, freezers for the preparation of soft ices. Freezers of this type generally comprise a replenishing or supply container for the ice mix to be processed which can flow out of the supply container through a supply tube or duct into the freezing kettle. In the type of freezer to which the invention relates this kettle is preferably arranged in a horizontal position and is provided at its intake end with an intake compartment that is separated from the actual freezing compartment by a separating wall connected with the stirring shaft with which it rotates. The finished food ice product is discharged from the end of the freezing compartment or chamber which is opposite the intake compartment, by a discharge or distributing device. In accordance with the invention the freezing kettle or compartment of this type of food ice freezer is provided with an intake compartment of particular construction which makes possible and facilitates the supply or introduction of the air required to properly loosen or fluff the food ice product while automatically maintaining the correct level of the ice mix in the freezing compartment.

Summary of the invention

In accordance with the invention the intake chamber or compartment is provided on the side opposite from the separating wall with a compressed air connection for introducing the air that serves to loosen the food ice product. In addition, the spacing wall is of special construction, as described hereinafter.

It is, therefore, an object of the invention to provide a food ice freezer, particularly for soft ice, having special means for properly introducing air to loosen the mix in the supply and freezing compartments to insure the proper consistency, while maintaining the proper level of the mix.

Brief description of the drawings

Other advantages and objects of the invention will become apparent from the following description with reference to the accompanying drawings, in which.

Description of preferred embodiment of the invention

Figure 1:
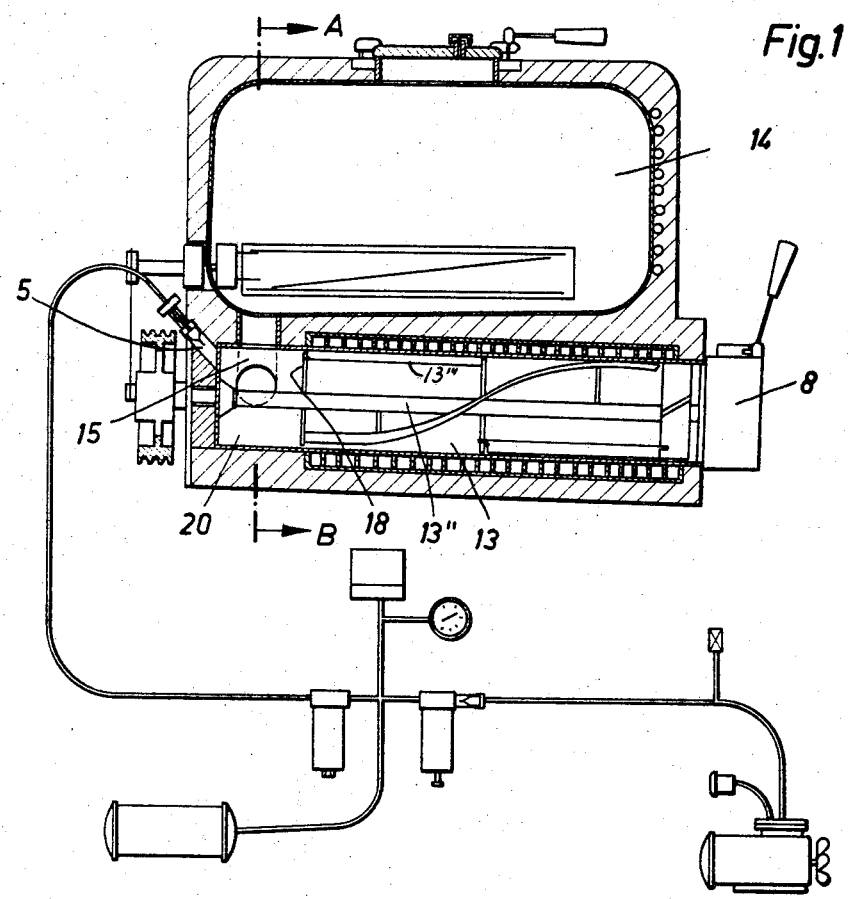
FIG. 1 is a longitudinal section of the food ice freezer with schematic illustration drawn to a smaller scale of a compressed air supply installation.
Figure 2:
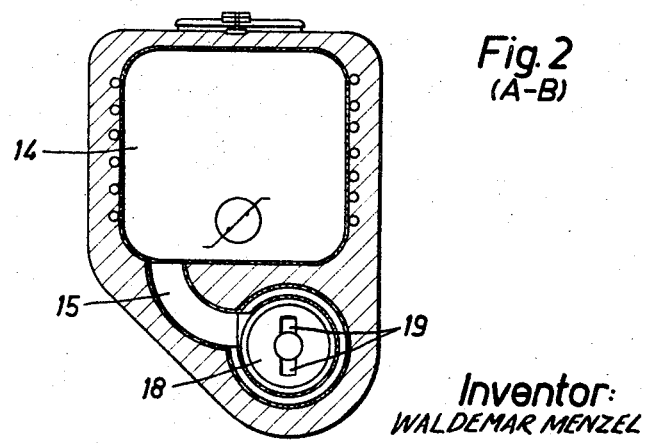
FIG. 2 is a cross-section taken along line A–B in FIG. 1.
Figure 3:
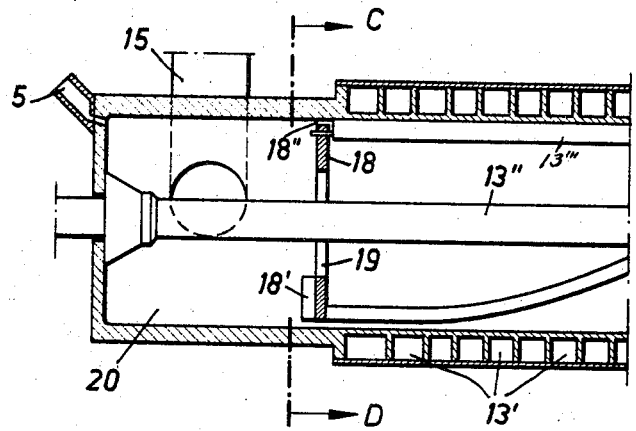
FIG. 3 shows a longitudinal section of the intake end of the freezing compartment drawn to a somewhat enlarged scale.
Figure 4:
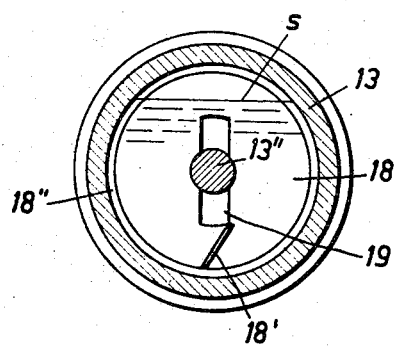
FIG. 4 is a cross-section taken along line C–D in FIG. 3.

As shown particularly in FIGS. 3 and 4, the separating wall or disk 18 is spaced from the wall of the freezing kettle merely by a small gap 18″ which is only a few millimeters wide, which permits in general only the balancing of air pressure between the intake chamber 20 and the actual freezing compartment of the freezer kettle 13 but not the passage of larger quantities of ice mix. In order to permit such passage, but without forgoing sufficient separation of the freezing compartment from the intake chamber, the separating wall or disk 18 is provided proximate its central part with one or more radial slots 19, which, on the one hand, permit the passage of ice mix for supplying the freezing compartment, while on the other hand they allow the return flow of excess ice mix from the freezing compartment into the intake chamber 20, whence the ice mix can be forced back into the supply container 14 through the intake duct or tube 15 by means of the excess air pressure. The freezing compartment 13 has an air space in its upper part which is in communication with the intake chamber 20 by way of the gap 18″ at the circumference of the separating wall 18. The level of the ice mix in the freezing compartment is indicated at s.

The slots 19 are so short that their outer ends remain constantly below the level s of the ice mix when the compartment contains the normal amount of mix, and thus they do not establish an air passage even when they temporarily pass through their vertical position.

To avoid freezing of the gap 18″ around the circumference of the separating wall, the disk 18 is disposed outside the area of the freezing compartment which is surrounded by the freezing ducts 13′. A spacing of one to two centimeters from the freezing ducts or coils is sufficient.

The passage of ice mix through the separating wall is intended to take place also when the contents of the freezing compartment are already slightly frozen and when the ice mix contains solid bodies, particularly fruit pulp and the like. The slots 19, therefore, must be sufficiently large. In order to facilitate the passage of solid bodies the spacing wall or disk 18 is provided with scoop-like guide elements 18′ which, while rotating, raise the solid bodies and thus guide them toward the slot openings 19.

The guiding scoops that rotate with the disk 18 also prevent settling of solid lumps at the intake side of the disk or wall 18. At the side of the freezing compartment of this wall freezing of the ice mix against the wall is prevented in the area of the gap 18″ by a scraping member or blade 12‴, known per se, which adjoins the spacing wall 18 and which, during operation, cleanly scrapes the inner surface of the wall of the freezing kettle 13.

Having now described the invention with reference to the embodiment illustrated in the drawings, the invention is not intended to be limited thereto, but what is desired to be protected by Letters Patent of the United States is set forth in the appended claims.

I claim:
1. A freezing kettle for soft ice freezers disposed horizontally and having refrigeration means therefor and including an intake compartment for ice mix and a freezing compartment, a stirring device rotatably disposed in the freezing compartment, a separating disk mounted at one end of said stirring device for rotation therewith and defining a separating wall between said intake compart- ment and the freezing compartment, a supply container connected to the intake compartment, slot means comprising at least one radially extending slot defined in the separating disk proximate the center thereof to permit passage of ice mix between the intake compartment and the freezing compartment in both directions and the return to the supply container of excess ice mix flowing back into the intake compartment, a compressed air connection extending into said intake compartment on the side opposite from said separating disk, and the periphery of the disk being spaced from the wall of the kettle defining a small gap of about 1 to 2 mm. to permit passage of air through said gap.

2. A freezing kettle in accordance with claim 1, where an air space is defined above the level of the ice mix in said kettle and said slot means comprise a plurality of slots having outer ends disposed continually below the normal level of the ice mix in said kettle.

3. A freezing kettle in accordance with claim 2, comprising guiding scoops arranged proximate the outer ends of said slots, operative to guide solid bodies in the ice mix toward said slots.

References Cited
UNITED STATES PATENTS

| | | | |
|---|---|---|---|
| 2,132,364 | 10/1938 | Thompson | 62—69 |
| 3,044,878 | 7/1962 | Knedlik | 62—306 X |
| 3,183,681 | 5/1965 | Lutz et al. | 62—342 X |
| 3,222,035 | 12/1965 | Lutz et al. | 62—70 X |

ROBERT A. O'LEARY, *Primary Examiner.*

W. E. WAYNER, *Assistant Examiner.*